US008122033B2

(12) United States Patent
Le et al.

(10) Patent No.: US 8,122,033 B2
(45) Date of Patent: Feb. 21, 2012

(54) DATABASE QUERY OPTIMIZATION

(75) Inventors: Jian Le, San Mateo, CA (US); Wenbin Ma, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 11/971,525

(22) Filed: Jan. 9, 2008

(65) Prior Publication Data
US 2009/0177621 A1 Jul. 9, 2009

(51) Int. Cl.
*G06F 17/00* (2006.01)
(52) U.S. Cl. ........ 707/749; 707/731; 707/728; 707/723; 707/717; 707/706
(58) Field of Classification Search .............. 707/706, 707/717, 720, 723, 728, 731, 749
See application file for complete search history.

(56) References Cited

U.S. PATENT DOCUMENTS

| | | | |
|---|---|---|---|
| 6,496,819 B1 | 12/2002 | Bello et al. | |
| 6,763,352 B2 | 7/2004 | Cochrane et al. | |
| 7,072,897 B2 | 7/2006 | Shah et al. | |
| 7,111,020 B1 | 9/2006 | Gupta et al. | |
| 7,240,078 B2 | 7/2007 | Cheng et al. | |
| 2004/0122814 A1 | 6/2004 | Zhang et al. | |
| 2005/0192961 A1 | 9/2005 | Dittrich et al. | |
| 2006/0195437 A1 | 8/2006 | Dietel | |
| 2007/0061287 A1 | 3/2007 | Le et al. | |
| 2007/0073657 A1 | 3/2007 | Santosuosso | |
| 2007/0100911 A1 | 5/2007 | Barsness et al. | |
| 2008/0215578 A1* | 9/2008 | Dietel | 707/5 |

OTHER PUBLICATIONS

Shanmugam K. Satish et al., DB2 performance enhancements using Materialized Query Table for LUW, Second International Conference on Systems, 2007, IEEE.
Calvanese Diego et al., View-based Query Processing and Constraint Satisfaction, IEEE, 2000, 0-7695-0725-5.
Gray et al. Data Cube: A Relational Aggregation Operator Generalizing Group-By, Cross-Tab, and Sub-Totals, IEEE 1996, 1063-6382.
Larsen, Sheryl M., DB2 V8 on z/OS Experiences in SQL and Programs, Powerful SQL—Sheryl M. Larsen, Inc., Jun. 12, 2006, Kansas City, MO.

* cited by examiner

*Primary Examiner* — Sana Al Hashemi
(74) *Attorney, Agent, or Firm* — Yudell Isidore Ng Russell PLLC

(57) ABSTRACT

A method, system, and computer program product for optimizing database queries in a data processing system. A query optimization (QO) utility maximizes the query coverage of Materialized Query Tables (MQTs) in order to efficiently process various types of incoming queries to a database engine. In particular, the QO utility enables MQT technology for nullable foreign key columns in a number of table joins involving fact tables and dimension tables, in which the fact tables and dimension tables have column data which are not null. The QO utility also enables MQT query matching for a relational database engine for non-additive measures, and improves the performance of existing query-matching capabilities for a relational database engine for additive measures. The QO utility specifies a number of functionally dependent relationships between the columns of a table in order to enhance the query matching abilities of the database engine.

18 Claims, 14 Drawing Sheets

Figure 2
(Prior Art)

| Product ID | Store ID | Sales | Cost |
|---|---|---|---|
| 1 | 1 | 120 | 100 |
| Null | 2 | 34 | 20 |
| 2 | 1 | 566 | 400 |

| Product ID | Product Name | Category |
|---|---|---|
| 1 | Memory Chip | Hardware |
| 2 | Printer | Hardware |

| Product ID | Product Name | Category | Store ID | Sales | Cost |
|---|---|---|---|---|---|
| 1 | Memory Chip | Hardware | 1 | 120 | 100 |
| 2 | Printer | Hardware | 1 | 566 | 400 |

Figure 4A

400 create summary table mqt_month_sum as  ← 401
(
  select        b.month1970,
                sum(a.sales) as sum_sales     ← 402
  from          Time_Dim b,
                Sales_Fact a                   ← 403
  where         b.day_id = a.day_id
  group by      b.month1970                    ← 405
) data initially deferred refresh deferred;

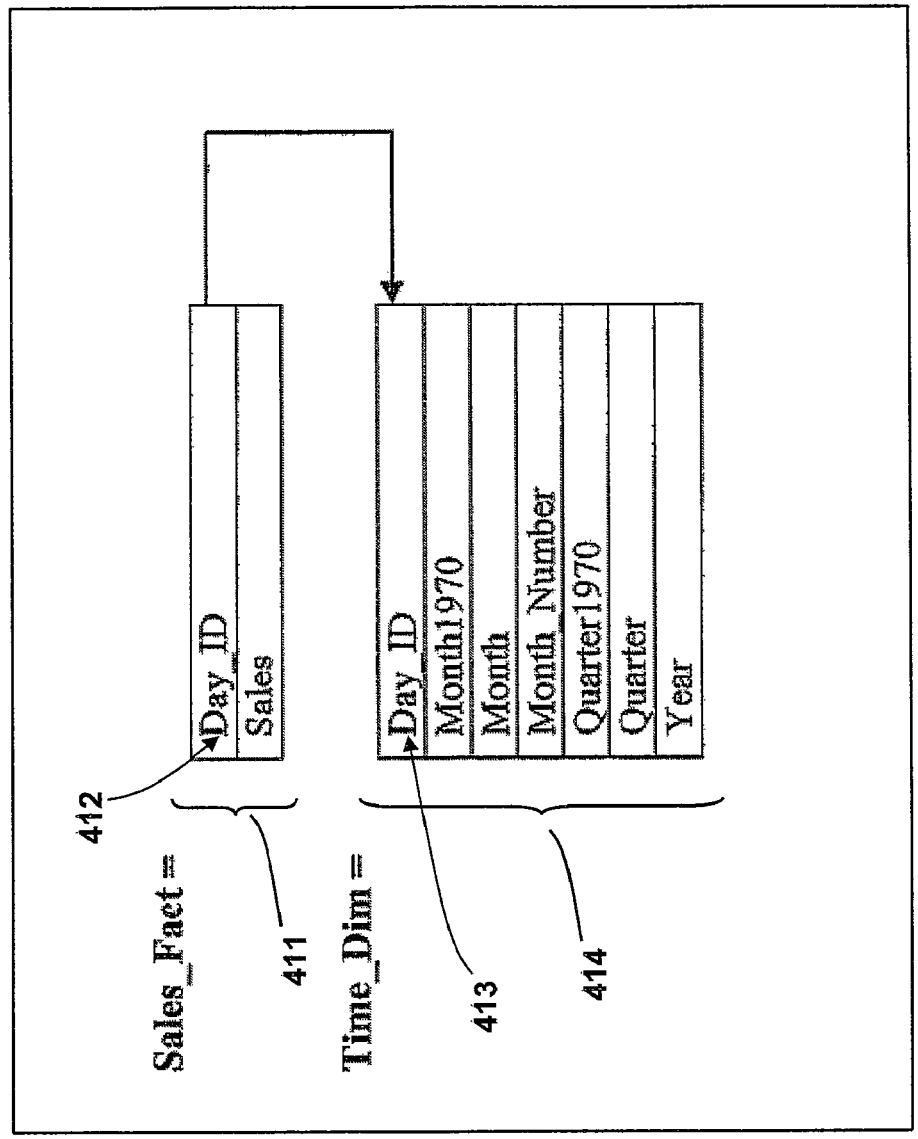

```
select    b.quarter1970,
          b.quarter,
          b.year,
          sum(a.sales) as sum_sales
from      Time_Dim b,
          Sales_Fact a
where     b.day_id = a.day_id
group by  b.quarter1970,
          b.quarter,
          b.year
```

416 — select clause
417 — from clause
419 — group by clause

```
select   b.quarter1970,
         b.quarter,
         b.year,
         sum(a.sum_sales)
from     (select month1970, quarter1970, quarter, year from Time_Dim group by month1970,
         quarter1970, quarter, year) as b,
         mqt_month_sum a                                                                    } 426
where    b.month1970 = a.month1970
group by b.quarter1970, b.quarter, b.year
```

Figure 5A

MQT 1:

create summary table mqt_month_stddev as
( 
  select b.month1970,
         stddev(a.sales) as stddev_sales
  from date_month_dim b,
       sales_fact a
  where b.day_id = a.day_id
  group by b.month1970
) data initially deferred refresh deferred;

Figure 5D

Query 3:
select
  b.month1970,
  b.month,
  c.quarter,
  c.year,
  stddev(a.sales) as stddev_sales
from
  date_month_dim b,
  sales_fact a,
  quarter_dim c
where
  b.day_id = a.day_id and
  c.quarter1970 = b.quarter1970
group by
  b.month1970,
  b.month,
  c.quarter,
  c.year

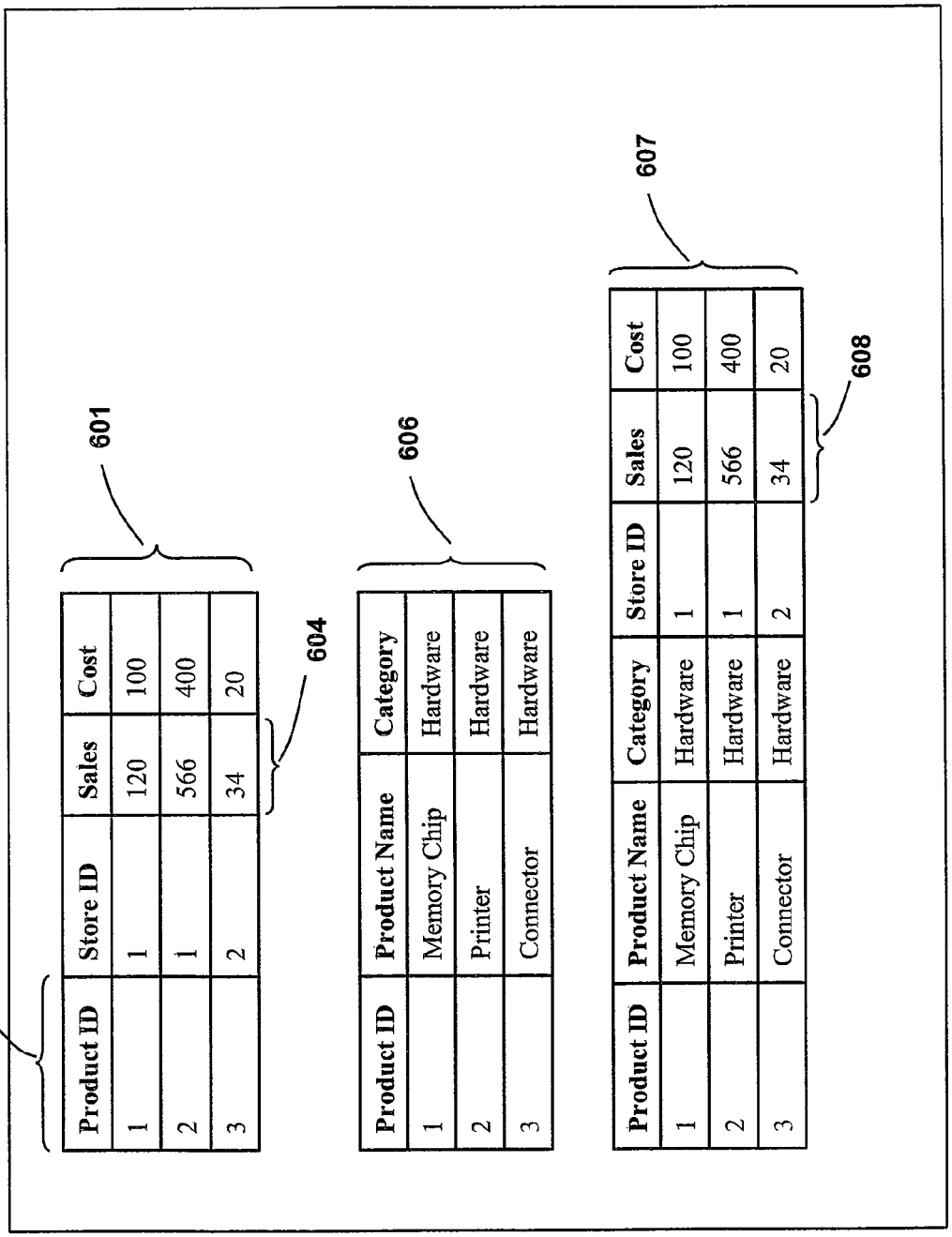

DATABASE QUERY OPTIMIZATION

BACKGROUND

1. Technical Field

The present invention generally relates to data processing systems and in particular to database query optimization in data processing systems.

2. Description of the Related Art

As data volume grows rapidly in many data warehouse systems, new database optimization techniques are sought to improve the performance of queries against these data warehouse systems. One way to improve the query performance is to reduce the size of input data needed to process a query. For example, if an annual sales total query is issued against a data warehouse fact table whose data grain is at a daily level, 365 daily sales records would be required to derive a yearly sales result. However, if quarterly sales data were pre-computed against this same fact table and the quarterly sales data were stored inside a table, this pre-computed quarterly sales data may be used to compute the yearly sales data. In this case, only 4 quarterly sales records will be needed to derive this yearly sales data, a sizable reduction from the original 365 daily sales records.

A key enabler of this kind of powerful query optimization technique lies at the mathematical equation used in the calculation, in which equivalent query results can be derived from some intermediate query results pre-calculated from the same set of input data. For example, if the mathematical equation involved in a query is a SUM function, then SUM over 100 raw data points is equivalent to a SUM of two Subtotals such that each Subtotal is a SUM over 50 original raw data points. Or a SUM over 100 raw data points is equivalent to a SUM of four Subtotals such that each Subtotal is a SUM over 25 original raw data points. If these subtotals are pre-calculated and stored, these subtotals may be used to help compute the SUM over 100 raw data points in an efficient manner.

In a relational database system, these subtotals may be pre-aggregated for certain measures and the results stored into a table. This result table is called a Materialized Query Table (MQT) in a database collection (e.g., International Business Machine's (IBM's) database 2 (DB2)) and a Materialized Views (MV) in Oracle. The query used to compute these results is called the definition query of this MQT (or MV). For convenience, this pre-aggregate technology in a relational database may be referred to as MQT technology from here on.

Though the MQT technology can be applied to any queries, the MQT technology is extremely popular in business intelligence (BI) applications as queries generated from these applications often involve some kind of aggregations. Therefore, the performance of BI applications is heavily influenced by the performance of the query processing component of a relational database engine that, in turn, is heavily influenced by the performance of its MQT (or MV) technology. Though the MQT technology has been proven to provide amazing query performance by re-using some pre-computed query results, a relational database engine places a higher premium on the reliability and accuracy of these equivalent query results.

SUMMARY OF ILLUSTRATIVE EMBODIMENTS

Disclosed are a method, system, and computer program product for optimizing database queries in a data processing system. A query optimization (QO) utility maximizes the query coverage of Materialized Query Tables (MQTs) in order to efficiently process various types of incoming queries issued to a database engine. In particular, the QO utility enables MQT technology for nullable foreign key columns in a number of table joins involving fact tables and/or dimension tables, in which the fact tables and dimension tables have column data which are not null. The QO utility also enables MQT query matching for a relational database engine for non-additive measures, and improves the performance of existing query-matching capabilities for a relational database engine for additive measures. The QO utility also exploits a number of conventional or extended functionally dependent relationships between the columns of a table in order to enhance the query matching abilities of a database engine.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 is a collection of base tables illustrating the effect of a table join involving a nullable foreign key column whose data is null, according to the prior art;

FIG. 4 illustrates one portion of an optimized method for expanding MQT query coverage for an incoming query based on additive measures, according to one embodiment of the invention;

FIG. 6 is a collection of base tables illustrating the effect of a table join involving a nullable foreign key column whose data is not null, according to one embodiment of the invention.

DETAILED DESCRIPTION OF AN ILLUSTRATIVE EMBODIMENT

Figure 1:
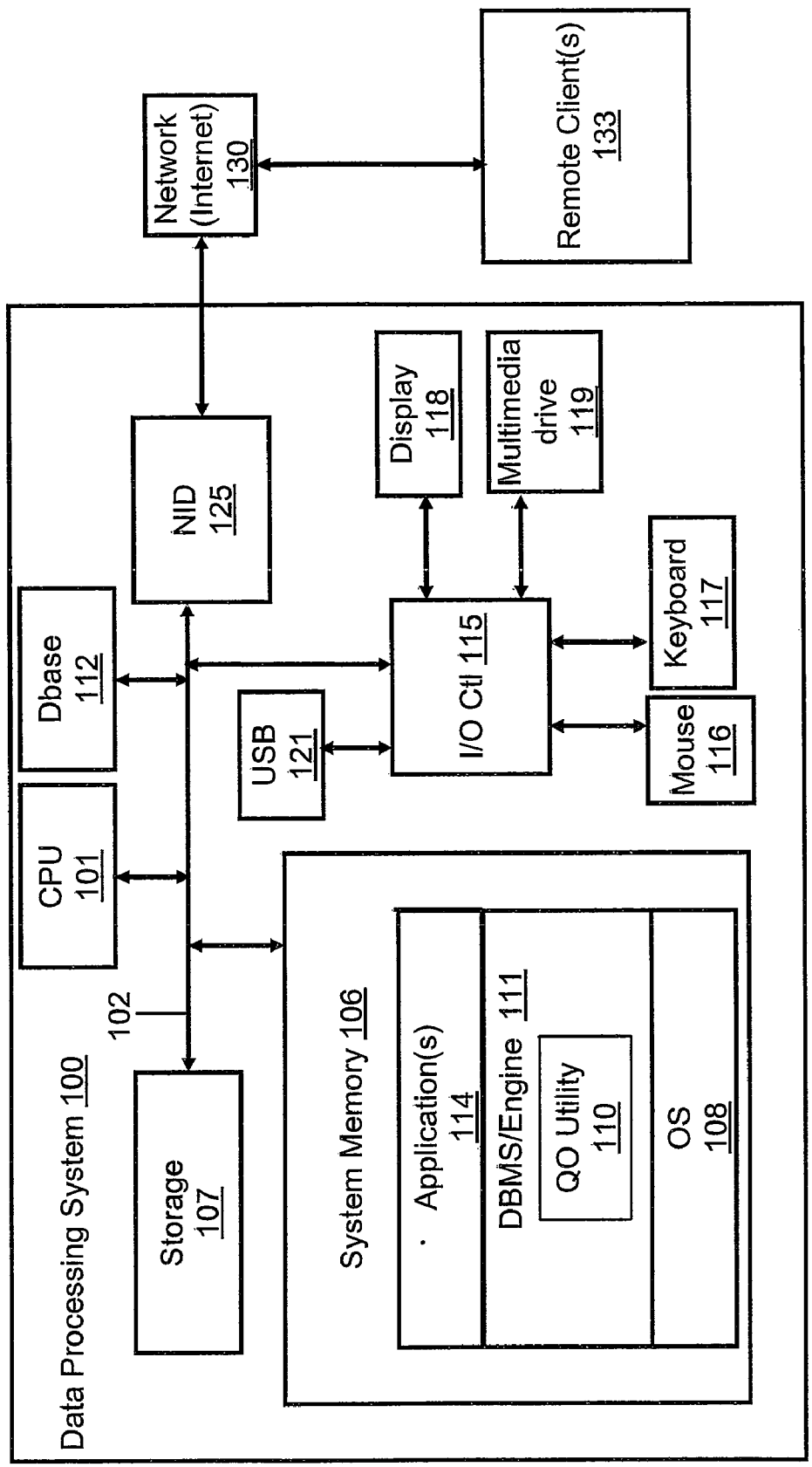
FIG. 1 is a block diagram representation of a data processing system, according to one embodiment of the invention.

The illustrative embodiments provide a method, system, and computer program product for optimizing database queries in a data processing system. A query optimization (QO) utility maximizes the query coverage of Materialized Query Tables (MQTs) in order to efficiently process various types of incoming queries to a database engine. In particular, the QO utility enables MQT technology for nullable foreign key columns in a number of table joins involving fact tables and dimension tables, in which the fact tables and dimension tables have column data which are not null. The QO utility also enables MQT query matching for a relational database engine for non-additive measures, and improves the performance of existing query-matching capabilities for a relational database engine for additive measures. The QO utility also exploits a number of conventional and extended functionally dependent relationships between the columns of a table in order to enhance the query matching abilities of the database engine.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to FIG. 1, there is depicted a block diagram representation of a data processing system (and connected network). DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) port 121 are illustrated, coupled to I/O controller. Multimedia drive 119 and USB port 121 may operate as both input and output (storage) mechanisms for insertion of removable storage media. DPS 100 also comprises storage 107, within which data/instructions/code may be stored. Additionally, DPS 100 is associated with a database 112 that is utilized to store data. As described below, the data within database 112 may be stored in tables and accessed or processed via a query mechanism provided as one of the embodiments of the invention.

DPS 100 is also illustrated with a network interface device (NID) 125, with which DPS 100 connects to one or more clients 133 via access network 130, such as the Internet. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, GNU®/Linux®, registered trademarks of the Free Software Foundation and Linus Torvalds, or AIX®), a registered trademark of IBM), database application(s) 114, Database Management System (DBMS)/Database engine 111, and query optimization (QO) utility 110. Database applications 114 and DBMS 111 enable access to and manipulation of data stored in database 112. Additionally, QO utility 110 enables advance query functionality to process data stored in database 112. In actual implementation, DBMS engine 111 and QO utility 110 may be combined as a single application collectively providing the various functions of each individual software component when the corresponding code is executed by the CPU 101. In one embodiment, QO utility 110 may be implemented as a stand alone or separate software/firmware component. For simplicity, QO utility 110 is described as a stand alone or separate software/firmware component, which provides specific functions, as described below.

In the illustrative embodiment, QO utility 110 generates/provides several graphical user interfaces (GUI) to enable user interaction with, or manipulation of, the functional features of the utility (110). Among the software code/instructions provided by QO utility 110, and which are specific to the invention, are: (a) code for identifying nullable foreign key columns whose data is not-null; (b) code for specifying not-null table check constraints for these identified foreign key columns; (c) code for identifying nullable level key columns whose data is not null; (d) code for specifying not-null table check constraints for these identified level key columns; (e) code for defining a number of functional dependent relationships between columns of each of a number of tables involving these identified level key columns; (f) code for determining whether an MQT is a candidate for providing an answer/coverage for an incoming query; and (g) code for rewriting an incoming query using a set of optimal MQTs. For simplicity of the description, the collective body of code that enables these various features is referred to herein as QO utility 110. According to the illustrative embodiment, when CPU 101 executes QO utility 110, DPS 100 initiates a series of functional processes that enable the above functional features as well as additional or detailed features/functionality, which are described below within the description of FIGS. 3-6.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

FIG. 2 is a collection of base tables illustrating a table join, according to the prior art. FIG. 2, illustrated by table set 200, comprises sales fact table 201, product dimension table 206, and resultant table 207. Sales fact table 201 comprises foreign key column (product_ID) 203. Included within foreign key column 203 is null entry 202. Sales fact table 201 also comprises first sales column entries 204. Illustrated in resultant table 207 is second sales column entries 208.

A foreign key is a referential constraint between two tables. The foreign key identifies a column or a set of columns in one (referencing) table that refers to a column or set of columns in another (referenced) table. A referential constraint enables referential integrity in a relational database. Referential integrity provides consistency between coupled tables. Referential integrity is usually enforced by the combination of a primary key and a foreign key. For referential integrity to hold, any field in a table that is declared a foreign key may contain only values from a parent table's primary key. For instance, deleting a record of a parent table that contains a value referred to by a foreign key in another table would break referential integrity. In a relational database, a referential integrity holds if the foreign key column value is either null or matches one of the primary (or unique) key column values. Then by the definition of a primary key (or a unique key), there is only one row in the referenced table that contains a particular primary (or a unique key) column value(s). So, in general, the foreign key reflects a many (child table, or referencing table) to one (master table, or referenced table) relationship.

Referring again to FIG. 2, if the foreign key columns, for example, foreign key column 203, of a fact table (201) do include null values (202), rows of the fact table (201) whose foreign key column values are nulls are eliminated from the resultant table (207) generated when fact table 201 is joined with a dimension table (206).

In table set 200, resultant table 207 has fewer numbers of rows than the original fact table (201). More importantly, the sum of Sales column values (208) of resultant table (207) is not the same as the sum of Sales column values (204) of the original fact table (201). So in this situation, many database engines do not use an MQT (whose definition query involves a table, e.g., dimension table 206, that changes the data cardinality of a query) to rewrite an incoming query that does not involve this table. That means, if a MQT involves {SALES FACT, PRODUCT, STORE} tables and if the join between the SALES_FACT and PRODUCT tables in its definition query is defined on SALES_FACT's ProductID column, the database engine will not match an incoming query involving {SALES FACT, STORE} tables to this MQT.

In general, a relational database engine places a particularly high premium on the reliability and accuracy of query results. For example, if a MQT's definition query joins the same set of tables as an incoming query does, the database engine may consider this MQT for rewriting this incoming query regardless of whether a table join among this set of tables has changed the data cardinality of the resultant table or not. This is because the resultant tables of MQT and the incoming query have the identical intermediate table contents. For another example, if a MQT's definition query involves (a join of) tables "T1", "T2" and "T3" and if an incoming query involves (a join of) tables "T2" and "T3" only, the database engine needs to make sure that the extra table (not included in the incoming query but included in the definition query), "T1", used in the MQT does not change the data cardinality of (the join of) T2 and T3. More specifically, in a data warehouse environment, if a MQT is defined on a fact table, "SALES FACT", that joins a PRODUCT dimension table and a STORE dimension table and if an incoming query is issued against the fact table, SALES_FACT and the STORE dimension table, a relation database engine checks to see if the join of the PRODUCT dimension table with the SALES_FACT table in MQT produces a table that reflects an increase or decrease in the number of rows when compared with the number of rows of the SALES_FACT table. If there is no change in the number of rows, the effective intermediate table contents used to derive the pre-computed values stored in this MQT are identical to the intermidiate table contents specified by this incoming query. Thus, the database engine may consider this MQT table to rewrite this incoming query.

Similarly, if the join between the STORE and SALES_FACT does not reflect an increased or decreased number of rows as compared with the number of rows of the SALES_FACT table, the database engine may use this same MQT to rewrite incoming queries that involve the {SALES FACT, PRODUCT} tables. In general, a data warehouse system that fashions a star-schema system usually involves one or more fact tables joined by a set of dimension tables. If all fact-to-dimension joins in a data warehouse system do not reflect an increased or decreased number of rows as compared with the number of rows of the fact table(s), then any MQT table that is defined on a set of fact tables and a set of dimension tables of this data warehouse system may be used to rewrite incoming queries that involve the same set of fact tables and a subset of the set of dimension tables used in the MQT's definition query. In other words, one MQT table may be used to rewrite a number of incoming queries. Actually, this MQT table is effectively playing the role of a fact table of a data mart spanned by the fact and dimension tables used in the MQT's definition query. The preceding has demonstrated an important role played by the joins between the fact tables and dimension tables for enabling a MQT technology in a data warehouse system.

Similar arguments may be made on the joins between two sub-dimension tables, i.e., between the MONTH and QUARTER tables in the Time dimension.

Thus, in order to quantify that a join between a source and a dependent table has not changed the data cardinality of the dependent table, a database engine conventionally uses two qualifying criteria: (1) A referential integrity constraint is defined between these two tables; and (2) The foreign key columns (of the dependent table) are defined as not null. Unfortunately, not all joins of a data warehouse system satisfy these two qualifying criteria. For example, in practice, some data warehouse designers have deliberately chosen to declare the foreign key columns of a referential constraint as nullable in order to speed up the data warehouse ETL (i.e., extract, transform and load) process. ETL is used to transfer data from one database to another, to form data marts (i.e., a collection of databases) and data warehouses (i.e., a relatively larger collection of databases), and also to convert databases from one format or type to another.

FIG. 6 is a collection of base tables illustrating a table join, according to one embodiment of the invention. FIG. 6, illustrated by table set 600, comprises sales fact table 601, product dimension table 606, and resultant table 607. Sales fact table 601 comprises foreign key column (Product_ID) 603. Sales fact table 601 also comprises first sales column entries 604. Illustrated in resultant table 607 is second sales column entries 608.

In table set 600, foreign key column 603, of a fact table (601) is defined as nullable but does not include any null values (unlike table set 200). The resultant table (607) is generated when fact table 601 is joined with a dimension table (606).

In table set 600, resultant table 607 has an equal number of rows as the original fact table (601). More importantly, the sum of Sales column values (608) of resultant (607) is the same as the sum of Sales column values (604) of the original fact table (601). In this case, one would imagine that a relational database engine would use the MQT table joining the PRODUCT dimension table with the SALES_FACT table to rewrite an incoming query that involves the SALES_FACT only. However, this information is not conveyed to the database engine. On the contrary, since the foreign key column (603) is defined as nullable, the database engine is concerned with the situation described in FIG. 2 in which some required input table rows were removed from the resultant table after the join. So to act on the caution side, the relational database engine deems this MQT table unsuitable to rewriting this incoming query. To remedy this suitable situation, the QO utility provides a non-null table check constraint on this nullable foreign key column to convey this non-null information to the database engine. So in this case, QO utility 110 overcomes the limitations of the conventional criteria in which a foreign key column has to be defined as not-null. That means, if a MQT involves {SALES FACT, PRODUCT, STORE} tables and if the join between the SALES_FACT and PRODUCT tables in its definition query is defined on some nullable foreign key columns that do not include any null values, the QO utility 110 will consider this MQT for rewriting an incoming query involving {SALES FACT, STORE} table. Thus, QO utility 110 expands the query coverage of an MQT whose resultant table is shown in 607.

In general, a database engine may execute a number of preliminary actions for a set of tables of a data warehouse as part of an initialization procedure for the data warehouse. These preliminary actions may be repeated when the data warehouse table schema is changed or the table contents are refreshed.

To facilitate efficient query rewriting techniques using MQT tables, the database engine may execute some preliminary actions to define one or more of the following: (1) a number of functional dependencies; (2) the primary keys for a number of base tables; (3) a number of referential integrity constraints; and (4) a number of not-null table check constraints for each detected nullable foreign key column and level key column whose data is not null.

In some data warehouse systems, the foreign key columns have been deliberately declared as nullable in the data warehouse table schema definitions in order to speed up the ETL process. Some proprietary code has been written in the ETL process to ensure that the foreign key column values are not null and the referential integrity in the data warehouse data is satisfied. However, this method has inadvertently posed some challenges for the relational database engine that utilizes some physical referential constraints in the database catalog tables to apply the powerful MQT technology to queries generated by these systems.

To enable MQT technology for this kind of data warehouse system, or other data warehouse systems that have used some physical referential constraints to ensure data quality, the database engine initiates the following steps: (1) a physical referential constraint is defined for fact-to-dimension and dimension-to-dimension joins for which the physical referential check by a database engine is desired; (2) an informational referential constraint is defined for fact-to-dimension and dimension-to-dimension joins for which the physical referential check by a database engine is not desired or is ensured elsewhere, for example, as in the ETL process; and (3) The database engine declares a physical (or an informational) not-null table check constraint for each detected nullable foreign key column whose data is not null.

QO utility 110 extends the conventional qualifying criteria (i.e., a physical or informational referential integrity constraint is defined between two tables, and the foreign key columns are not-null) for query rewrite and utilizes the following enhanced criteria: (a) a physical or informational referential integrity constraint is defined between two tables; and (b) the foreign key columns are defined as not-null, or the foreign key columns are defined as nullable, but the physical (or informational) not-null table check constraints are defined for these nullable foreign key column.

Figure 3A:
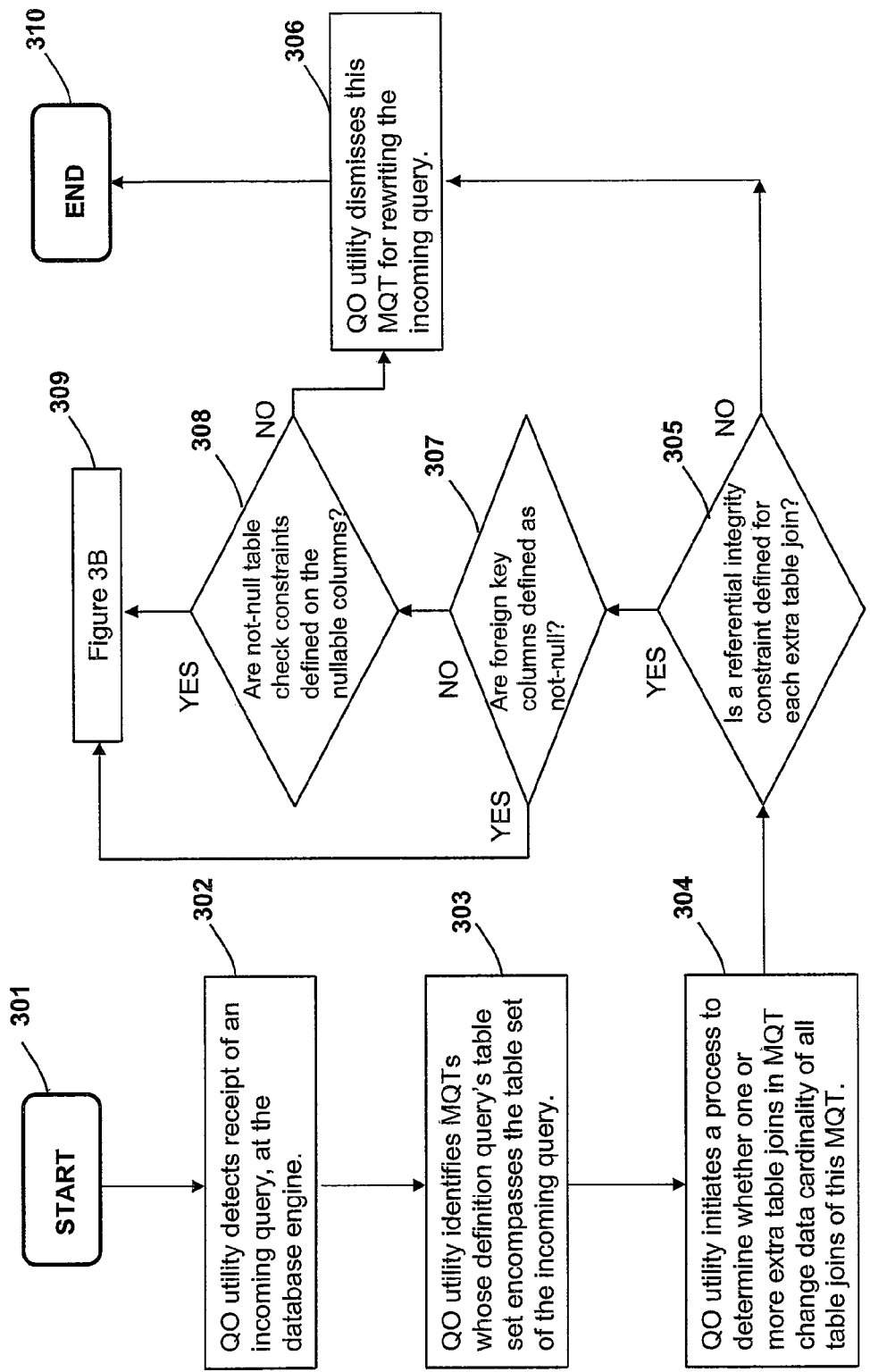
FIG. 3 (FIG. 3A, 3B) is a flow chart which illustrates an algorithm of evaluating the eligibility of an MQT table for rewriting an incoming query, according to one embodiment of the invention.

With reference now to FIG. 3, a flow chart which provides a high-level algorithm of evaluating the eligibility of a MQT table for rewriting an incoming query is illustrated, according to one embodiment of the invention. FIG. 6 provides an example of a portion of the algorithm employed in FIG. 3. Although the algorithm illustrated in FIG. 3 may be described with reference to components shown in FIG. 1, it should be understood that this is merely for convenience and alternative components and/or configurations thereof can be employed when implementing the algorithm. Key portions of the algorithm may be completed by QO utility 110 executing within DPS 100 (FIG. 1) or may be combined with other query rewriting methods in DBMS 111 and controlling specific operations of/on DPS 100, and the algorithm is thus described from the perspective of either/both QO utility 110 and DPS 100.

The process begins at initiator block 301 and proceeds to block 302, at which, QO utility 110 detects the receipt of an incoming query at the database engine. QO utility 110 identifies MQT(s) whose definition query's table set includes the table set of the incoming query, in order to initiate a branch of evaluation to determine whether the MQT is a candidate match for the incoming query, as shown at block 303. At block 304, QO utility 110 initiates a process to determine whether one or more extra table joins used to create the MQT change the "data cardinality" of all table joins of this MQT. The tables listed within the MQT's definition query include a number of fact/referencing tables and one or more dimension/referenced tables. At block 304, QO utility 110 initiates a process to determine whether a resultant table from a join of (1) the fact table(s) appearing in both the definition query and the incoming query, and (2) the other tables in the definition query (which do not appear in the incoming query) reflects an increase or a decrease in the number of rows as compared to the number of rows in the fact table. In other words, QO utility 110 initiates a process to determine whether a data cardinality is changed or not as a result of the join.

QO utility 110 first determines whether the referential integrity constraints (for a group of the tables referenced) have been defined, as shown at decision block 305. If QO utility 110 determines that the appropriate referential integrity constraints have been defined, QO utility 110 then determines whether the foreign key columns have been defined as not-null, as shown at decision block 307. However, if, at block 305, QO utility 110 determines that the appropriate referential integrity constraints have not been defined, QO utility 110 dismisses that the MQT as a candidate match for the incoming query, as shown at block 306. The process ends at block 310. If at block 307, QO utility 110 determines that the foreign key columns have been defined as not-null (i.e., data cardinality will not change as a result of the join), the process proceeds to block 309 which indicates that the evaluation of the MQT continues in FIG. 3B. If at block 307, QO utility 110 determines that the foreign key columns have not been defined as not-null (i.e., the foreign key columns are defined as nullable), QO utility 110 then determines whether the not-null table check constraints have been defined, as shown at decision block 308. If, at block 308, QO utility 110 determines that the appropriate not-null table check constraints have not been defined, the process proceeds to block 306, at which, QO utility 110 concludes that the MQT is not a match for the incoming query. If, at block 308, QO utility 110 determines that the appropriate not-null table check constraints have been defined, the process enters block 309. By executing the enhanced criteria, QO utility 110 has effectively enabled the powerful MQT technology for a larger set of data warehouse systems and business intelligence application queries.

Figure 3B:
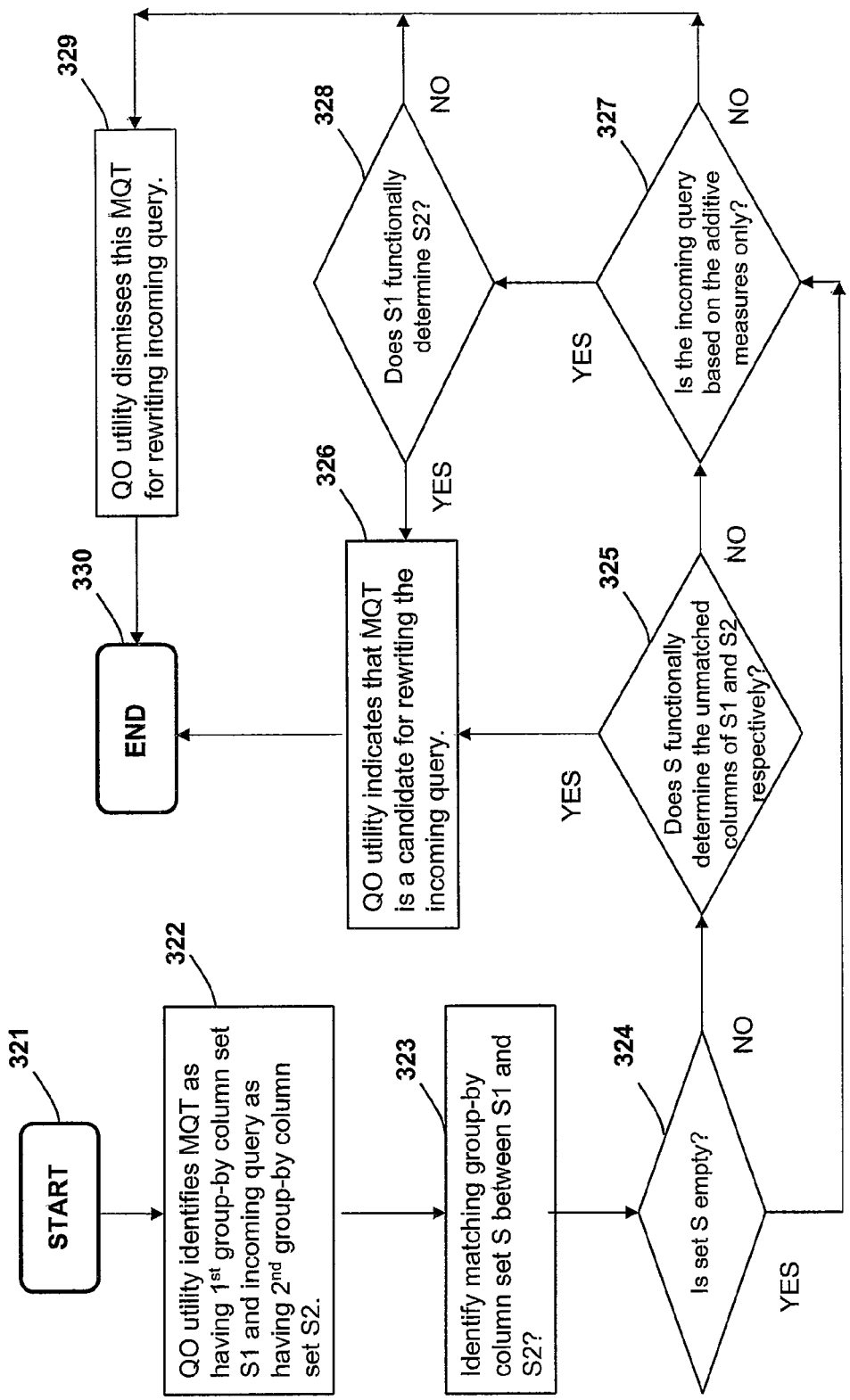

FIG. 3B is a flow chart illustrating other portions of the high-level algorithm of evaluating the eligibility of an MQT for rewriting an incoming query based on the mathematical calculations being performed subsequently on the table-join operation results, according to one embodiment of the invention. More specifically, these mathematical calculations are expressed by one or more measures of the incoming query and the definition query of a MQT. A further description of the steps illustrated in FIG. 3B is facilitated with the illustrations of FIGS. 4 and 5. The process begins at initiator block 321 and proceeds to block 322, at which, QO utility 110 identifies a first column set "S1" corresponding to the MQT (based on the group-by list) and a second column set "S2" corresponding to the incoming query (also based on the group-by list).

At block 323, QO utility 110 identifies the matching group-by column set "S" between S1 and S2, where S1 is the group-by column set of the definition query of MQT and S2 is the group-by column set of the incoming query. In one embodiment, S1 may also be the expanded group-by column set of the definition query of MQT. At decision block 324, QO utility 110 determines whether the set "S" is an empty set. If at block 324, QO utility 110 determines that the set "S" is an empty set, the process proceeds to decision block 327, at which, QO utility 110 determines whether the incoming query is based exclusively on additive measures. If at block 324, QO utility 110 determines that the set "S" is not an empty set, the process proceeds to decision block 325, at which, QO utility 110 determines whether the matched set of columns "S" functionally determines the unmatched set of columns "R1" of the first column set "S1" and the unmatched set of columns "R2" of the second column set "S2", respectively. In one embodiment, an empty umnatched set may be functionally determined by a non-empty set of matched columns. If at block 325, QO utility 110 determines that the matched set of columns does not functionally determine the unmatched columns of the first column set and unmatched columns of the second column set, respectively, the process proceeds to decision block 327. If at block 325, QO utility 110 determines that the matched set of columns functionally determines the unmatched columns of the first column set and unmatched columns of the second column set, respectively, the process proceeds to block 326, at which QO utility 110 indicates that the MQT is a candidate match for the incoming query. Notably, the presently described portion of the algorithm is applicable to incoming queries of all types of measures.

Refer to FIG. 3B again. If at block 327, QO utility 110 determines that the incoming query is based exclusively on additive measures, the process enters decision block 328, at which, QO utility 110 determines whether the first group-by column set "S1" corresponding to the MQT functionally determines the group-by second column set "S2" specified by the incoming query. If at block 328, QO utility 110 determines that the first column set "S1" does not functionally determine the second column set "S2", the process proceeds to block 329, at which, QO utility 110 dismisses the MQT for rewriting the incoming query (i.e., the MQT is not considered a candidate match for the incoming query). If at block 328, QO utility 110 determines that the first column set "S1" functionally determines the second column set "S2", the process proceeds to block 326, at which QO utility 110 indicates that the MQT is a candidate for the incoming query. The process ends at block 330.

In the flow chart above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

FIG. 4A is an illustration of an example definition query for an MQT, based on additive measures, according to one embodiment of the invention. MQT query 400 creates an MQT which may be identified as "mqt_month_sum" 401. MQT query 400 comprises a number of lists which include the following: (1) a "select" list (402); (2) a "from" list (403); and (3) a "group by" list (405).

MQT query 400 indicates that "mqt_month_sum" 401 is created from base tables "Sales_Fact" and "Time_Dim", as shown by "from" list 403, and, in particular, from data within columns "month1970" and "sum(sales_fact.sales)" (indicated by "select" list 402) from the "Time_Dim" and "Sales_Fact" base tables. The sum aggregation function used in the "select" list (402) also indicates that "mqt_month_sum" 401 is based on an additive query.

FIG. 4B is an illustration of an example fact table and an example dimension table utilized in the definition query of the MQT, according to one embodiment of the invention. Table set 410 comprises a fact table, illustrated as "Sales_Fact" 411. Table set 410 also comprises a dimension table, illustrated as "Time_Dim" 414. Column "Day_ID" 412 is the foreign key column which appears in table, "Sales_Fact" 411, and column "Day_ID" 413 is the primary key column, which appears in table"Time_Dim" 414.

FIG. 4C is an illustration of an example incoming query to a database engine, based on additive measures, according to one embodiment of the invention. Query 415 represents an incoming query to a database engine. Query 415 comprises a number of lists which include the following: (1) a "select" list (416); (2) a "from" list (417); and (3) a "group by" list (419).

Query 415 indicates that data from base tables "Sales_Fact" and "Time_Dim", as shown by "from" list 417, and, in particular, from data within columns "quarter1970", "quarter", "year", and "sum(sales_fact.sales)" (indicated by "select" list 416) from the "Time_Dim" and "Sales_Fact" base tables. The "select" list (416) also indicates that query 415 is an additive query.

FIG. 4D illustrates an example of a rewritten incoming query when an MQT provides coverage for the query, according to one embodiment of the invention. Enhanced query 425 comprises a number of lists which include a "from" list (426). The "from" list (426) indicates that incoming query 415 is rewritten by utilizing the MQT, "mqt_month_sum" 401.

When QO utility 110 detects the receipt of incoming query 415 at a database engine, QO utility 110 first initiates a process to determine whether the table join operation of MQT 401 has not changed the data granularity of the table join operation of incoming query 415 or not. Then, when QO utility 110 reaches block 328 of FIG. 3, QO utility 110 initiates a process to determine whether MQT 401 is capable of providing full coverage for the table columns of "group by" list 419 of incoming query 415 as depicted at block 328 (FIG. 3). The database engine (111) determines whether the table columns of "group by" list 405 of definition query 400 encompass the table columns of "group by" list 419 of incoming query 415. If the "group by" list 405 does not encompass the "group by" list 419, the database engine (111) determines if there is a relationship (called functional dependency) between the table columns of "group by" list 405 of definition query 400 and the table columns of "group by" list 419 of incoming query 415.

QO utility 110 is able to expand the query coverage of the MQT by utilizing "functional dependency" criteria, which define a dependent relationship between two sets of columns of the same table. In this case, QO utility 110 has previously defined, as described above, a functional dependency relationship in a database catalog table that states that column set {time_dim.month1970} functionally determines column set {time_dim.quarter1970, time_dim.quarter, time_dim.year}.

QO utility 110 extends the conventional requirement in defining a functional dependency. The conventional requirement requires that when a functional dependency is defined as one set of table columns (Set A) functionally determines another set of table columns (Set B), the columns in Set A have to be defined as not-null. This conventional requirement has created problems for some data warehouse systems where data warehouse designers have chosen to declare some level key columns (e.g., "month1970" and "quarter1970" columns) of a dimension table as nullable even though the column data stored in these level key columns are not null and functional dependencies between the level key columns and level property columns are highly desired. As a result, this conventional requirement has prevented a database administrator from creating the desired functional dependency and has compromised the effectiveness of MQT algorithms that use functional dependency to rewrite incoming queries. However, QO utility 110 provides a solution to the challenges posed by this conventional requirement.

QO utility 110 maximizes query coverage of MQT tables, by specifying as many functional dependencies as possible. In order to enable a functional dependency on nullable columns whose data is not-null, QO utility 110 relaxes the conventional requirement from: columns in Set A are defined as not-null; to: columns in Set A are defined as not-null, or columns in Set A are defined as nullable but the physical (or informational) not-null table check constraints are defined for these nullable table columns in Set A.

In this FIG. 4 example (illustrated by FIG. 4A, FIG. 4B, FIG. 4C and FIG. 4D), QO utility 110 determines that each one of the group-by list table columns of the incoming query is functionally dependent on at least one of the group-by list table columns of the definition query of a candidate MQT table.

The MQT query matching algorithm then uses these conventional and extended functional dependencies to help augment the table column set of the group-by list of an existing MQT at run-time. Thus, a database engine utilizing this new query matching algorithm has effectively enabled its powerful MQT technology for a larger set of data warehouse systems and business intelligence application queries.

FIG. 5A is an illustration of an example definition query for an MQT, based on non-additive measures, according to one embodiment of the invention. MQT definition query 500 creates an MQT which may be identified as "mqt_month_stddev" 501. Query 500 comprises a number of lists which include the following: (1) a "select" list (502); (2) a "from" list (503); (3) a "where" list (504); and (4) a "group by" list (505).

MQT query 500 indicates that "mqt_month_stddev" 501 is created from base tables "sales_fact" and "date_month_dim", as shown by "from" list 503, and, in particular, from data within column "month1970" and "stddev(sales_fact.sales)" (indicated by "select" list 502) from the "date_month_dim" and "sales_fact" base tables. The "select" list (502) also indicates that "mqt_month_stddev" 501 is based on a non-additive query.

Figure 5B:
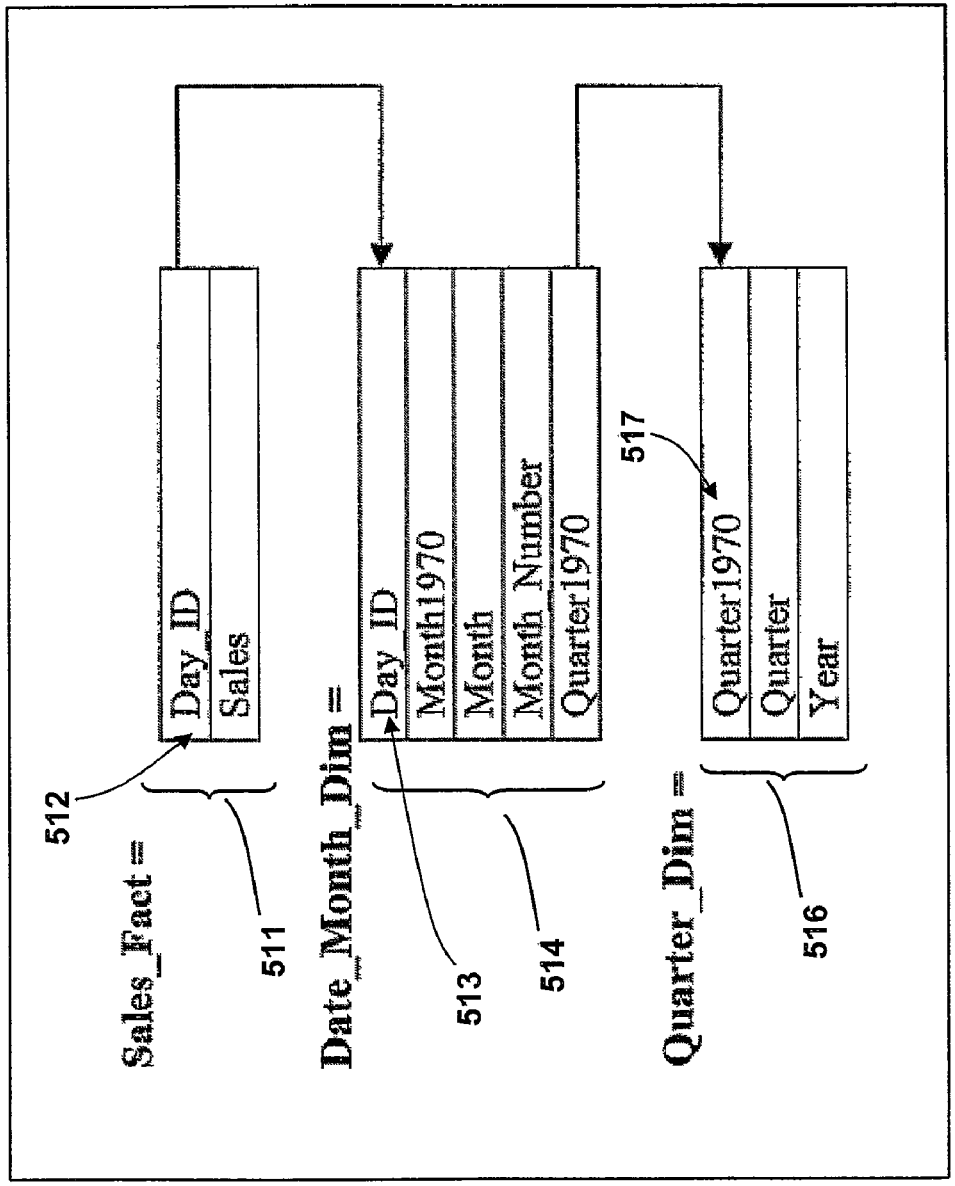
FIG. 5 illustrates another portion of the optimized method for expanding MQT query coverage for an incoming query based on non-additive measures, according to one embodiment of the invention.

FIG. 5B is an illustration of an example fact table, an example dimension table and an example sub-dimension table, according to one embodiment of the invention. Table set 510 comprises a fact table, illustrated as "Sales_Fact" 511. Table set 510 also comprises a dimension table, illustrated as "Date_Month_Dim" 514, and a sub-dimension table, illustrated as "Quarter_Dim" 516. Column "Day_ID" 512 is the foreign key column which appears in table "Sales_Fact" 511 and column "Day_ID" 513 is the primary key column which appears in table "Date_Month_Dim" 514. "Quarter 1970" 517 represents the primary key of table "Quarter_Dim" 516. Table set 510 comprises the base tables appearing in definition query 500 and the incoming queries (illustrated in FIGS. 5C and 5D).

Figure 5C:
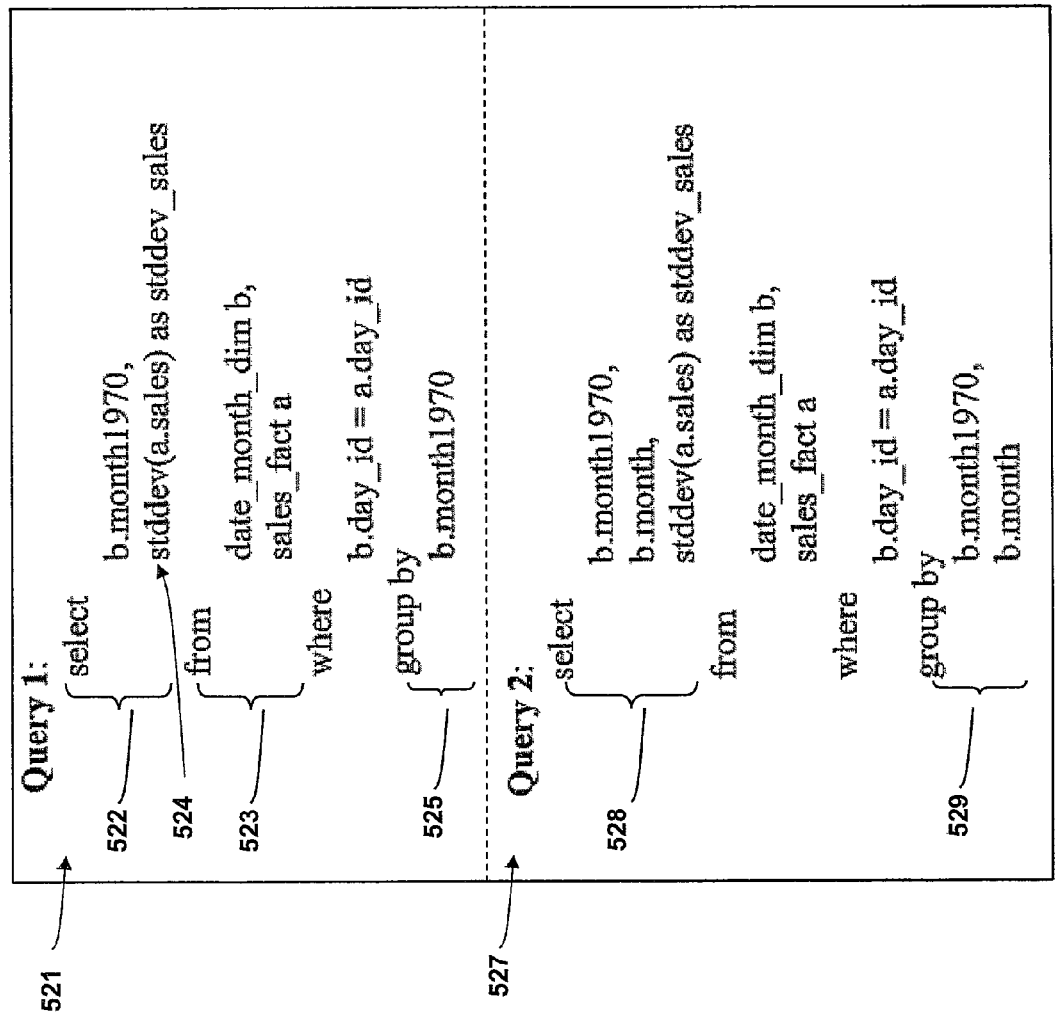

FIG. 5C is an illustration of a pair of example incoming queries to a database engine, according to one embodiment of the invention. Query set 520 comprises query 1 521 and query 2 527. Query 521 comprises a number of lists which include the following: (1) a "select" list (522); (2) a "from" list (523); (3) a "where" list; and (4) a "group by" list (525). Within "select" list 522, the measure applied is indicated by measure "stddev" 524, which represents the standard deviation operation (i.e., more generally, a non-additive measure). Similarly, query 527 comprises a number of lists which include the following: (1) a "select" list (528); (2) a "from" list; (3) a "where" list; and (4) a "group by" list (529). In query 527, the standard deviation is also the applied measure.

FIG. 5D is an illustration of another example incoming query to a database engine, according to one embodiment of the invention. Query 3 530 comprises a number of lists which include the following: (1) a "select" list (531); (2) a "from" list (532); and (3) a "group by" list (534). In query 530, the standard deviation is also the applied measure.

QO utility 110 utilizes a data granularity determination technique and pre-defined functional dependent relationships to determine whether "mqt_month_stddev" 501 is capable of providing an answer for any/all of the following queries: (1) query 521; (2) query 527; and (3) query 530. QO utility 110 employs a separate query matching determination for each of the three incoming queries (521, 527 and 530) based, in particular, on the differing "group by" lists (525, 529, and 534, respectively).

Figure 5E:
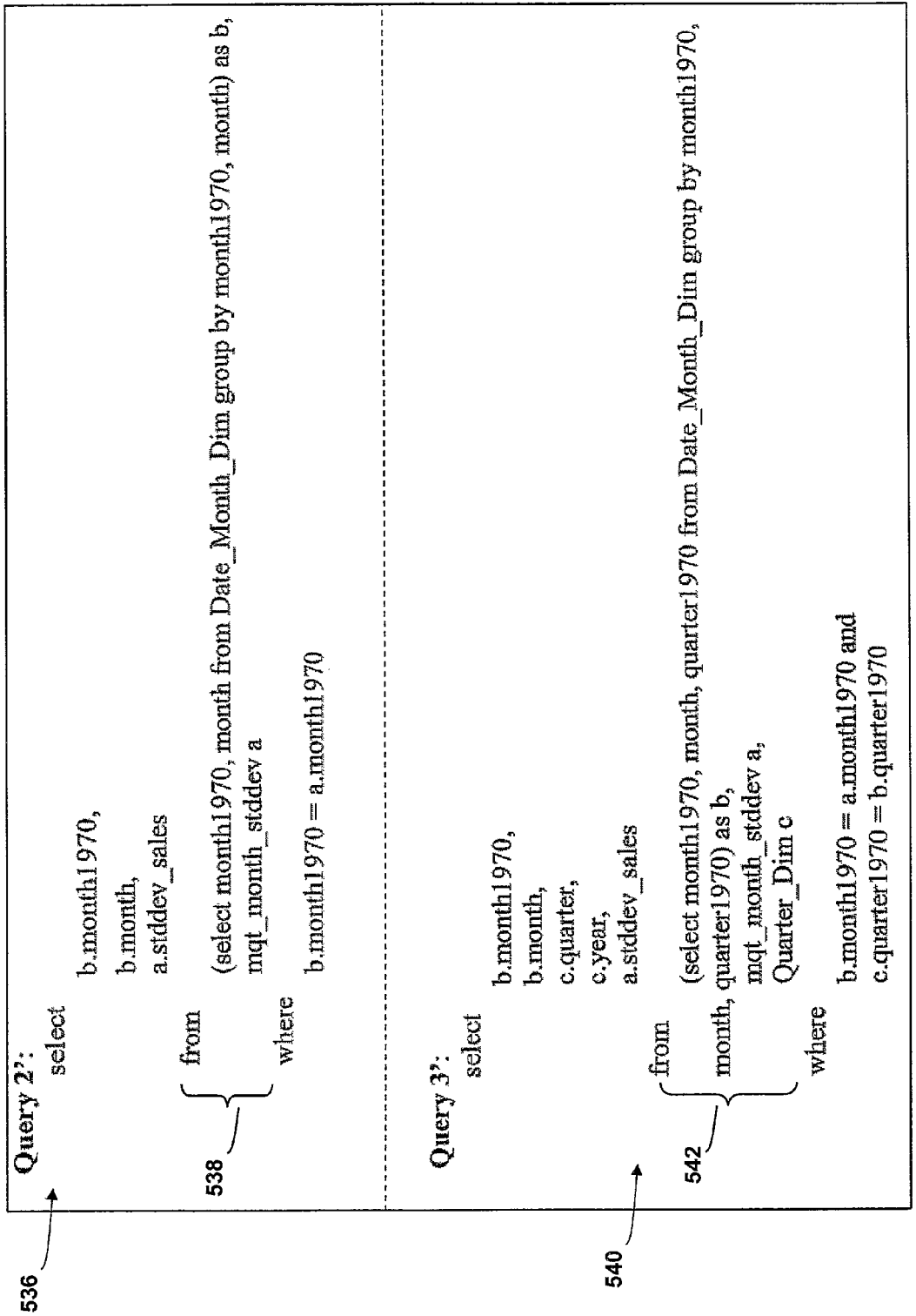

FIG. 5E illustrates an example pair of rewritten incoming queries when an MQT provides coverage for the queries, according to one embodiment of the invention. Query set 535 comprises enhanced query 2 536 and enhanced query 3 540. Enhanced query 2 536 comprises a number of lists which include a "from" list (538). Similarly, enhanced query 3 540 comprises a number of lists which include a "from" list (542).

When QO utility 110 detects the receipt of an incoming query (521, 527, or 530) at a database engine, QO utility 110 first initiates a process to determine whether the table join operation of MQT 501 has not changed the data granularity of the table join operations of incoming queries (521, 527, and 530) or not. Then, when QO utility 110 reaches block 322 of FIG. 3, QO utility 110 initiates a process to determine whether MQT 501 is capable of providing full coverage for the table columns of "group by" list(s) 525, 529, or 534 of incoming queries 521, 527, or 530, respectively. The database engine (111) compares the table columns of "group by" list 505 of definition query 500 with the table columns of "group by" list(s) 525, 529, or 534 of incoming queries 521, 527, or 530, respectively. A set of matched table columns, which appear in both (MQT query 500) "group by" list 505 and (incoming query 521) "group by" list 525, for example, are identified. Additionally, a first set of unmatched table columns, which appear only in (incoming query 521) "group by" list 525 is identified. A second set of unmatched table columns, which appear only in (MQT query 500) "group by" list 505 is identified. The database engine may use the MQT (500) to rewrite incoming query 521 since the matched group-by table columns from the definition and incoming queries functionally determine the unmatched group-by table columns of the definition and incoming queries.

Query 2 527 and query 3 530 may be rerouted to MQT 1 501 by a relational database engine if MQT 1's definition query has the same data granularity as these two incoming queries. In order to facilitate query matching of this type involving non-additive measures, QO utility 110 efficiently determines whether a MQT table in a relational database and an incoming query have the same data granularity or not. In essence, this determination consists of two steps. In step 1, optimization utility 110 identifies the matched group-by table columns between the MQT's definition query and the incoming query. In Step 2, optimization utility 110 determines whether the matched group-by table columns of these two queries derived in Step 1 functionally determine the unmatched group-by table columns of each query respectively. For example, the group-by table column of MQT 1 is "Date_Month_Dim.month1970", and the group-by table columns of Queries 1, 2, and 3 are respectively: (1) Date_Month_Dim.month1970; (2) Date_Month_Dim.month1970 and Date_Month_Dim.month; and (3) Date_Month_Dim.month1970, Date_Month_Dim.month, Quarter_Dim.quarter and Quarter_Dim.year.

In the first two cases (of query 1 and query 2), the matched group-by table column of the MQT and an incoming query (521 or 527) is {Date_Month_Dim.month1970} and this matched column functionally determines the unmatched group-by table columns {Date_Month_Dim.month} of incoming query 527. Then, since the MQT's definition query and the incoming query 527 have the same data granularity, a relational database engine may rewrite query 2 527 as illustrated by enhanced query 2 536.

In the third case (of query 3), the matched group-by table column of the MQT and the incoming query 530 is {Date_Month_Dim.month1970} and this matched column functionally determines the first unmatched group-by table column {Date_Month_Dim.month} as well as the regular table column {Date_Month_Dim.quarter1970} that does not appear in either query. Then, since there is a referential integrity constraint defined between the not-null {Date_Month_Dim.quarter1970} column and the primary-key {Quarter_Dim.quarter1970} column, this implies that {Date_Month_Dim.quarter1970} functionally determines the {Quarter_Dim.quarter, Quarter_Dim.year} columns. This implies that the matched group-by table column between MQT and incoming query 530 functionally determines the unmatched group-by table columns of MQT and incoming query 530. Then, since the MQT's definition query and the incoming query 530 have the same data granularity, a relational database engine may rewrite query 3 530 as illustrated by enhanced query 3 540.

Then if we change the aggregation function used in FIGS. 5A, 5C, 5D, and 5E from a non-additive measure "STDDEV" to an additive measure "SUM", the same arguments still hold. Then the "from" list (538) of the enhanced query 2 536 and the "from" list (542) of the enhanced query 3 540 show that no additional GROUP-BY operation is needed. So in this case, the application of the technique to determine the group-by data granularity between a candidate MQT table and an incoming query has helped improve the performance of existing MQT technology for additive measures.

In summary, query optimization (QO) utility 110 fills an important MQT technology void in matching non-additive measures and improving the performance of existing MQT query matching algorithms on additive measures.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a computer system having a relational database system, a method comprising:

creating a number of materialized query tables (MQTs) within the database system;

defining one or more database table specifications, including a primary key of a table for a number of tables;

receiving an incoming query at the database system;

in response to the incoming query referencing a first subset of a set of tables, identifying an MQT with a definition query that references the set of tables, wherein said first subset includes one of: (a) a number of fact tables and a group of dimension tables; (b) a number of source tables and a group of dependent tables; and (c) a number of referencing tables and a group of referenced tables;

determining when the MQT is a candidate match for the incoming query;

identifying one or more candidate MQTs;

selecting an optimal MQT from among the one or more candidate MQTs; and when (a) a definition query of the MQT uses a corresponding group-by column list to reference a first number of columns from a set of tables and (b) the incoming query references a second number of columns from the same set of tables, determining one or more of the following: (1) whether one or more of the first number of columns is identical to one or more of the second number of columns; (2) whether one or more of the first number of columns is not contained within the second number of columns; (3) whether one or more of the second number of columns is not contained within the first number of columns; and (4) whether the first number of columns functionally determines the second number of columns.

2. In a computer system having a relational database system, a method comprising:

creating a number of materialized query tables (MQTs) within the database system;

defining one or more database table specifications, including a primary key of a table for a number of tables;

receiving an incoming query at the database system;

in response to the incoming query referencing a first subset of a set of tables, identifying an MQT with a definition query that references the set of tables, wherein said first subset includes one of: (a) a number of fact tables and a group of dimension tables; (b) a number of source tables and a group of dependent tables; and (c) a number of referencing tables and a group of referenced tables;

determining when the MQT is a candidate match for the incoming query;

identifying one or more candidate MQTs;

selecting an optimal MQT from among the one or more candidate MQTs;

when the MQT is identified as a candidate match for the incoming query, determining whether the MQT is a best match from among a number of candidate matches for the incoming query; and when the MQT is identified as the best match for the incoming query, rewriting the incoming query utilizing the MQT.

3. A data processing system comprising:

a processor which executes a database management system (DMS) software;

a memory system which stores a database system and the DMS software;

a utility which when executed on said processor provides functions of:

creating a number of materialized query tables (MQTs) within the database system;

defining one or more database table specifications;

receiving an incoming query at the database system;

in response to the incoming query referencing a first subset of a set of tables, identifying an MQT with a definition query that references the set of tables, wherein said first subset includes one of: (a) a number of fact tables and a group of dimension tables; (b) a number of source tables and a group of dependent tables; and (c) a number of referencing tables and a group of referenced tables;

determining when the MQT is a candidate match for the incoming query;

identifying one or more candidate MQTs;

selecting an optimal MQT from among the one or more candidate MQTs;

when the MQT is identified as a candidate match for the incoming query, determining whether the MQT is a best match from among a number of candidate matches for the incoming query; and when the MQT is identified as the best match for the incoming query, rewriting the incoming query utilizing the MQT.

4. A computer program product comprising:

a computer readable medium; and program code on said computer readable medium that when executed by a processor provides the functions of:

creating a number of materialized query tables (MQTs) within the database system;

defining one or more database table specifications;

receiving an incoming query at the database system;

in response to the incoming query referencing a first subset of a set of tables, identifying an MQT with a definition query that references the set of tables, wherein said first subset includes one of: (a) a number of fact tables and a group of dimension tables; (b) a number of source tables and a group of dependent tables; and (c) a number of referencing tables and a group of referenced tables;

determining when the MQT is a candidate match for the incoming query;

identifying one or more candidate MQTs;

selecting an optimal MQT from among the one or more candidate MQTs;

when the MQT is identified as a candidate match for the incoming query, determining whether the MQT is a best match from among a number of candidate matches for the incoming query; and when the MQT is identified as the best match for the incoming query, rewriting the incoming query utilizing the MQT.

5. The method of claim 1, wherein said database table specifications further include one or more of the following:

(1) a physical referential integrity constraint for a number of fact-to-dimension table joins and dimension-to-dimension table joins;

(2) an informational referential integrity constraint for a number of fact-to-dimension table joins and dimension-to-dimension table joins;

(3) a number of functionally dependent relationships between a plurality of columns of a table for a number of tables within the database system;

(4) one or more physical not-null table check constraints are defined for nullable foreign key columns within a referential constraint; and (5) one or more informational not-null table check constraints are defined for nullable foreign key columns within a referential constraint;

wherein the column data of said foreign key columns are not null.

6. The method of claim 1, wherein said determining further comprises:

identifying a second subset of tables which are referenced by the definition query of the MQT and which second subset of tables are not referenced by the incoming query, wherein said second subset includes one of: (a) a group of dimension tables; and (b) a group of source tables;

determining when a join of the one or more fact tables of the first subset and one or more dimension tables of the second subset has an equal number of rows compared with the number of rows of the one or more fact tables of the first subset;

dismissing the MQT as a candidate match for the incoming query when one of: (a) a data cardinality is not maintained, such that a join of the number of fact tables of the first subset and the group of dimension tables of the second subset does not generate a resultant table that has an equal number of rows compared with a number of rows of the fact tables of the first subset and (b) a number of prerequisites are not satisfied, said prerequisites include one or more of the following qualifying conditions:

(1) a physical referential integrity constraint for said join is defined;
(2) an informational referential integrity constraint for said join is defined;
(3) one or more physical not-null table check constraints are defined on nullable foreign key columns; and
(4) one or more informational not-null table check constraints are defined on nullable foreign key columns;

wherein the column data of said foreign key columns are not null.

7. The method of claim 1, further comprising:
when one or more of the group-by columns of the definition query of the MQT are expanded using functional dependency relationships, creating the first set of columns that includes the group-by columns of the MQT definition query expanded;
when one or more of the group-by columns of the incoming query are identified, defining the second set of columns by utilizing the one or more of the group-by columns of the incoming query;
when one or more matching columns between the first set and the second set are identified, creating a matched group using the one or more matching columns;
when one or more of the group-by columns of the first set that do not belong to the matched group are identified, creating a first unmatched group that comprises the one or more of the group-by columns of the first set that do not belong to the matched group; and
when one or more of the group-by columns of the second set that do not belong to the matched group are identified, creating a second unmatched group that comprises the one or more of the group-by columns of the second set that do not belong to the matched group.

8. The method of claim 1, further comprising:
when the matched group exists and the non-empty first unmatched group and the second unmatched group are identified:
(1) determining whether the matched group functionally determines the non-empty first unmatched group and the second unmatched group; and
(2) identifying the MQT as a candidate match when (a) the matched group exists and is identified, (b) the matched group functionally determines the non-empty first and second unmatched group(s), and (c) one or more of the qualifying conditions are satisfied;
when the matched group does not exist or the matched group exists but does not functionally determine the non-empty first and second unmatched group(s):

(1) determining whether the incoming query is based on measures which are exclusively additive; and
(2) identifying the MQT as a candidate match when (a) the incoming query is based on measures which are exclusively additive, (b) the number of columns in the said first set functionally determines the number of columns in the said second set, and (c) one or more of the qualifying conditions are satisfied.

9. The data processing system of claim 3, wherein said database table specifications include one or more of the following:
(1) a physical referential integrity constraint for a number of fact-to-dimension table joins and dimension-to-dimension table joins;
(2) an informational referential integrity constraint for a number of fact-to-dimension table joins and dimension-to-dimension table joins;
(3) a primary key of a table for a number of tables;
(4) a number of functionally dependent relationships between a plurality of columns of a table for a number of tables within the database system;
(5) one or more physical not-null table check constraints are defined for nullable foreign key columns within a referential constraint; and
(6) one or more informational not-null table check constraints are defined for nullable foreign key columns within a referential constraint;

wherein the column data of said foreign key columns are not null.

10. The data processing system of claim 3, wherein said determining function further comprises the functions of:
identifying a second subset of tables which are referenced by the definition query of the MQT and which second subset of tables are not referenced by the incoming query, wherein said second subset includes one of: (a) a group of dimension tables; and (b) a group of source tables;
determining when a join of the one or more fact tables of the first subset and one or more dimension tables of the second subset has an equal number of rows compared with the number of rows of the one or more fact tables of the first subset;
dismissing the MQT as a candidate match for the incoming query when one of: (a) a data cardinality is not maintained, such that a join of the number of fact tables of the first subset and the group of dimension tables of the second subset does not generate a resultant table that has an equal number of rows compared with a number of rows of the fact tables of the first subset and (b) a number of prerequisites are not satisfied, said prerequisites include one or more of the following qualifying conditions:

(1) a physical referential integrity constraint for said join is defined;
(2) an informational referential integrity constraint for said join is defined;
(3) one or more physical not-null table check constraints are defined on nullable foreign key columns; and
(4) one or more informational not-null table check constraints are defined on nullable foreign key columns.

11. The data processing system of claim 3, wherein said utility further provides the functions of:
when one or more of the group-by columns of the definition query of the MQT are expanded using functional dependency relationships, creating the first set of columns that includes the group-by columns of the MQT definition query expanded;

when one or more of the group-by columns of the incoming query are identified, defining the second set of columns by utilizing the one or more of the group-by columns of the incoming query;

when one or more matching columns between the first set and the second set are identified, creating a matched group using the one or more matching columns;

when one or more of the group-by columns of the first set that do not belong to the matched group are identified, creating a first unmatched group that comprises the one or more of the group-by columns of the first set that do not belong to the matched group; and when one or more of the group-by columns of the second set that do not belong to the matched group are identified, creating a second unmatched group that comprises the one or more of the group-by columns of the second set that do not belong to the matched group.

12. The data processing system of claim 3, wherein said utility further provides the functions of:

when the matched group exists and the non-empty first unmatched group and the second unmatched group are identified:
(1) determining whether the matched group functionally determines the non-empty first unmatched group and the second unmatched group; and
(2) identifying the MQT as a candidate match when (a) the matched group exists and is identified, (b) the matched group functionally determines the non-empty first and second unmatched group(s), and (c) one or more of the qualifying conditions are satisfied;

when the matched group does not exist or the matched group exists but does not functionally determine the non-empty first and second unmatched group(s):
(1) determining whether the incoming query is based on measures which are exclusively additive; and
(2) identifying the MQT as a candidate match when (a) the incoming query is based on measures which are exclusively additive, (b) the number of columns in the first set functionally determines the number of columns in the second set, and (c) one or more of the qualifying conditions are satisfied.

13. The computer program product of claim 4, wherein said database table specifications include one or more of the following:
(1) a physical referential integrity constraint for a number of fact-to-dimension table joins and dimension-to-dimension table joins;
(2) an informational referential integrity constraint for a number of fact-to-dimension table joins and dimension-to-dimension table joins;
(3) a primary key of a table for a number of tables;
(4) a number of functionally dependent relationships between a plurality of columns of a table for a number of tables within the database system;
(5) one or more physical not-null table check constraints are defined for nullable foreign key columns within a referential constraint; and
(6) one or more informational not-null table check constraints are defined for nullable foreign key columns within a referential constraint;
wherein the column data of said foreign key columns are not null.

14. The computer program product of claim 4, wherein said program code for determining further comprises program code for:

identifying a second subset of tables which are referenced by the definition query of the MQT and which second subset of tables are not referenced by the incoming query, wherein said second subset includes one of: (a) a group of dimension tables; and (b) a group of source tables;

determining when a join of the one or more fact tables of the first subset and one or more dimension tables of the second subset has an equal number of rows compared with the number of rows of the one or more fact tables of the first subset;

dismissing the MQT as a candidate match for the incoming query when one of: (a) a data cardinality is not maintained, such that a join of the number of fact tables of the first subset and the group of dimension tables of the second subset does not generate a resultant table that has an equal number of rows compared with a number of rows of the fact tables of the first subset and (b) a number of prerequisites are not satisfied, said prerequisites include one or more of the following qualifying conditions:
(1) a physical referential integrity constraint for said join is defined;
(2) an informational referential integrity constraint for said join is defined;
(3) one or more physical not-null table check constraints are defined on nullable foreign key columns; and
(4) one or more informational not-null table check constraints are defined on nullable foreign key columns.

15. The computer program product of claim 4, further comprising program code for:

when one or more of the group-by columns of the definition query of the MQT are expanded using functional dependency relationships, creating the first set of columns that includes the group-by columns of the MQT definition query expanded;

when one or more of the group-by columns of the incoming query are identified, defining the second set of columns by utilizing the one or more of the group-by columns of the incoming query;

when one or more matching columns between the first set and the second set are identified, creating a matched group using the one or more matching columns;

when one or more of the group-by columns of the first set that do not belong to the matched group are identified, creating a first unmatched group that comprises the one or more of the group-by columns of the first set that do not belong to the matched group; and when one or more of the group-by columns of the second set that do not belong to the matched group are identified, creating a second unmatched group that comprises the one or more of the group-by columns of the second set that do not belong to the matched group.

16. The data processing system of claim 10, wherein said utility further provides the functions of:

when (a) a definition query of the MQT uses a corresponding group-by column list to reference a first number of columns from a set of tables and (b) the incoming query references a second number of columns from the same set of tables, determining one or more of the following:
(1) whether one or more of the first number of columns is identical to one or more of the second number of columns; (2) whether one or more of the first number of columns is not contained within the second number of columns; (3) whether one or more of the second number of columns is not contained within the first number of columns; and (4) whether the first number of columns functionally determines the second number of columns.

17. The computer program product of claim 14, further comprising program code for:

when (a) a definition query of the MQT uses a corresponding group-by column list to reference a first number of columns from a set of tables and (b) the incoming query references a second number of columns from the same set of tables, determining one or more of the following: (1) whether one or more of the first number of columns is identical to one or more of the second number of columns; (2) whether one or more of the first number of columns is not contained within the second number of columns; (3) whether one or more of the second number of columns is not contained within the first number of columns; and (4) whether the first number of columns functionally determines the second number of columns.

18. The computer program product of claim 15, further comprising program code for:

when the matched group exists and the non-empty first unmatched group and the second unmatched group are identified:

(1) determining whether the matched group functionally determines the non-empty first unmatched group and the second unmatched group; and (2) identifying the MQT as a candidate match when (a) the matched group exists and is identified, (b) the matched group functionally determines the non-empty first and second unmatched group(s), and (c) one or more of the qualifying conditions are satisfied;

when the matched group does not exist or the matched group exists but does not functionally determine the non-empty first and second unmatched group(s):

(1) determining whether the incoming query is based on measures which are exclusively additive; and (2) identifying the MQT as a candidate match when (a) the incoming query is based on measures which are exclusively additive, (b) the number of columns in the first set functionally determines the number of columns in the second set, and (c) one or more of the qualifying conditions are satisfied.

* * * * *